United States Patent
Gier

(10) Patent No.: US 12,471,601 B2
(45) Date of Patent: Nov. 18, 2025

(54) DEVICE FOR TWISTING PIECES OF DOUGH

(71) Applicant: FRITSCH BAKERY TECHNOLOGIES GMBH & CO. KG, Markt Einersheim (DE)

(72) Inventor: Michael Gier, Kitzingen (DE)

(73) Assignee: Fritsch Bakery Technologies Gmbh & Co. KG, Markt Einersheim (DE)

( * ) Notice: Subject to any disclaimer, the term of this patent is extended or adjusted under 35 U.S.C. 154(b) by 549 days.

(21) Appl. No.: 17/951,927

(22) Filed: Sep. 23, 2022

(65) Prior Publication Data

US 2023/0093732 A1   Mar. 23, 2023

(30) Foreign Application Priority Data

Sep. 23, 2021   (DE) .......................... 102021124622.9

(51) Int. Cl.
*A21C 3/08*   (2006.01)
*A21C 3/02*   (2006.01)

(52) U.S. Cl.
CPC . *A21C 3/08* (2013.01); *A21C 3/02* (2013.01)

(58) Field of Classification Search
None
See application file for complete search history.

(56) References Cited

U.S. PATENT DOCUMENTS

| | | | |
|---|---|---|---|
| 1,906,847 A | 5/1933 | Fitzgerald | |
| 2,132,158 A * | 10/1938 | Guldbech | A21C 3/08 425/363 |
| 3,028,821 A * | 4/1962 | Petersen | A21C 3/08 425/374 |
| 3,038,418 A | 6/1962 | Gugler | |
| 3,861,291 A * | 1/1975 | Guzaski | A21C 9/063 99/450.2 |
| 3,946,656 A | 3/1976 | Hai | |
| 3,993,422 A * | 11/1976 | Riviere | A21C 3/10 425/304 |

(Continued)

FOREIGN PATENT DOCUMENTS

| DE | 39 03 122 C1 | 5/1990 |
|---|---|---|
| DE | 202006005231 U1 | 6/2006 |

(Continued)

OTHER PUBLICATIONS

German Search Report Dated May 13, 2022, Application No. 10 2021 124 622.9, Applicant Fritsch Bakery Technologies Gmbh & Co. KG, 5 Pages.

(Continued)

*Primary Examiner* — Thor S Campbell

(74) *Attorney, Agent, or Firm* — Brooks Kushman P.C.

(57) ABSTRACT

A device for twisting pieces of dough comprises a conveyor configured to convey pieces of dough in a production direction. The device further comprises at least one holding belt arranged above the conveyor and configured to engage with a first portion of a piece of dough arranged on the conveyor. Further, the device comprises a turning device configured to turn a turning portion of the piece of dough relative to the first portion and upwardly while the holding belt engages with the first portion of the piece of dough.

20 Claims, 5 Drawing Sheets

(56) References Cited

U.S. PATENT DOCUMENTS

| | | | | |
|---|---|---|---|---|
| 4,008,025 A | * | 2/1977 | Campbell | A21C 7/01 425/332 |
| 4,147,809 A | * | 4/1979 | Thompson | A21C 11/002 425/364 B |
| 4,608,919 A | | 9/1986 | Prows et al. | |
| 4,767,638 A | * | 8/1988 | Uhrovic | A21C 3/08 425/372 |
| 5,609,094 A | * | 3/1997 | Ueno | A21C 3/06 99/450.2 |
| 5,674,547 A | * | 10/1997 | Vrouwenvelder | A21C 7/01 99/371 |
| 5,786,016 A | * | 7/1998 | Campbell | A21C 7/01 425/332 |
| 5,976,599 A | * | 11/1999 | Biernacki | A21D 6/00 99/426 |
| 6,039,993 A | * | 3/2000 | Vrouwenvelder | A21C 7/01 425/371 |
| 6,207,212 B1 | | 3/2001 | Nanahara et al. | |
| 7,338,681 B2 | * | 3/2008 | Merkle | A23L 15/00 426/89 |
| 8,961,165 B2 | * | 2/2015 | Van Blokland | A21C 3/06 425/371 |
| 11,896,015 B1 | * | 2/2024 | Tsai | A21C 9/063 |
| 2012/0152130 A1 | | 6/2012 | Robert | |
| 2012/0175226 A1 | * | 7/2012 | Gasser | B65G 21/12 198/570 |
| 2012/0207888 A1 | * | 8/2012 | King | A23P 20/12 118/31 |
| 2015/0130112 A1 | * | 5/2015 | Bertelsen | B29C 53/32 264/281 |
| 2018/0132490 A1 | * | 5/2018 | Van Blokland | A21C 7/01 |
| 2020/0236985 A1 | | 7/2020 | Itou et al. | |
| 2021/0212324 A1 | * | 7/2021 | Higuchi | A21C 3/06 |
| 2022/0061337 A1 | | 3/2022 | Bernhardt et al. | |
| 2024/0324607 A1 | * | 10/2024 | Van Blokland | B65G 43/00 |
| 2025/0107534 A1 | * | 4/2025 | Van Blokland | A21C 9/08 |

FOREIGN PATENT DOCUMENTS

| | | | | |
|---|---|---|---|---|
| DE | 602004012822 | T2 | 4/2009 | |
| DE | 202008000083 | U1 | 8/2009 | |
| DE | 10 2020 210 735 | A1 | 3/2022 | |
| EP | 962141 | A1 * | 12/1999 | A21C 3/06 |
| EP | 1726209 | A2 | 11/2006 | |
| EP | 2 253 215 | A1 | 11/2010 | |
| EP | 2366290 | A1 | 9/2011 | |
| EP | 3494793 | A1 | 6/2019 | |
| EP | 3613291 | A1 | 2/2020 | |
| GB | 183 848 | A | 7/1923 | |
| GB | 1450576 | A | 9/1976 | |
| IT | 20120014 | A1 | 4/2014 | |
| JP | H11 346642 | A | 12/1999 | |
| JP | 5 534782 | B2 | 7/2014 | |

OTHER PUBLICATIONS

European Search Report (with English Machine Translation) Dated Feb. 14, 2023, Application No. 22194755.9, Applicant Fritsch Bakery Technologies Gmbh & Co. KG, 12 Pages.

* cited by examiner

DEVICE FOR TWISTING PIECES OF DOUGH

CROSS-REFERENCE TO RELATED APPLICATIONS

This application claims foreign priority benefits under 35 U.S.C. § 119 (a)-(d) to German patent application number DE 10 2021 124 622.9, filed Sep. 23, 2021, which is incorporated by reference in its entirety.

TECHNICAL FIELD

The disclosure relates to a device for twisting pieces of dough.

BACKGROUND

Various types of dough products are known which are twisted and/or wrenched around a longitudinal axis during their production. In manual work, such dough products are gripped at opposite end portions for this purpose and these end portions are manually rotated in opposite directions about an axis oriented between the end portions. While this method of production for single twists is still relatively easy to accomplish even for the inexperienced, multiple twists require a significantly higher degree of skill and practice.

For this purpose, EP 2 253 215 A1 discloses a device for multiple twisting of dough strips. For this purpose, dough strips are delivered on a conveyor belt with two opposite ends protruding beyond the edges of the conveyor belt. The two ends are then gripped by two grippers. The dough strip is twisted by rotating the grippers. The grippers are also moved from the delivering conveyor belt to a discharging conveyor belt, onto which the twisted dough strips are deposited. This system requires a high engineering and control effort, is difficult to clean, and therefore causes high development, manufacturing and operating costs.

From GB 183 848 A a device for rolling up flat dough portions is known, in which hooks are provided for initiating the rolling-up process by folding a front edge of the dough portion upwards. From the post-published application DE 10 2020 210 735.1 a device is known which is configured for rolling-up, in this case filled, dough products. There, a holding belt is provided which is configured to engage with the product to be filled to ensure that the product to be filled is rolled-up in the dough as desired.

SUMMARY

It is an object of the disclosure to disclose an improved device for twisting, in particular for single twisting, of pieces of dough, which is simpler in design and thus less expensive to develop, manufacture and operate.

A device for twisting pieces of dough is disclosed. It comprises a conveyor configured to convey pieces of dough in a production direction, and at least one holding belt arranged above the conveyor and configured to engage with a first portion of a piece of dough arranged on the conveyor. The device further comprises a turning device configured to turn a turning portion of the piece of dough relative to the first portion and upwardly while the holding belt engages with the first portion of the piece of dough. An upward movement may be considered to be a movement directed away from the conveyor.

By rotating the turning portion upward while the holding belt is engaged with the first portion, the turning portion and the first portion may be twisted relative to each other. The configuration of this device is significantly simpler than prior art embodiments with rotating grippers that must also transport the twisted dough product from one conveyor belt to another. In addition, the simultaneous engagement of the holding belt with the first portion of the piece of dough and the twisting device with the twisting portion allows the portions to be twisted with respect to one another, whereas prior art embodiments having hooks only allow for winding.

It is conceivable that the holding belt and the turning device are arranged next to each other in a transverse direction that is oriented transversely, preferably perpendicularly, to the production direction. This may enable the piece of dough to be twisted about an axis, which is transverse, preferably perpendicular, to the production direction. This may be advantageous as the movement of the conveyor may be used to assist in rotating the turning portion.

The turning device may include at least one hook that may be pivotally arranged above the conveyor. A hook may be configured to initially engage with the piece of dough, particularly with the turning portion. By pivoting the hook, the piece of dough, particularly the turning portion, may be turned relative to the first portion and upward. By further pivoting the hook, the engagement with the piece of dough, in particular with the turning portion, may be automatically releasable. A hook pivotally arranged above the conveyor may thus be a particularly simple example of a turning device that may be operated without control effort.

It is particularly convenient if the hook has an engagement portion configured to engage with a piece of dough conveyed on the conveyor. This may mean that in a rest position and/or starting position of the hook, the engagement portion may rest on the conveyor or the distance of the engagement portion to a surface of the conveyor may be smaller than a thickness of the piece of dough. The thickness of the piece of dough may be defined in a direction perpendicular to the surface of the conveyor.

It is conceivable that the hook may be pivoted from a starting position to a deflected position by the engagement of the engagement portion with the piece of dough and its conveyance by the conveyor. This may have the advantage that no additional and/or separate drive needs to be provided for the movement of the hook. Preferably, in the deflected position of the hook, the engagement portion may be arranged upstream of a downstream end portion of the holding belt. A downstream end portion of the holding belt may be considered to be a portion at which the piece of dough, in particular the first portion of the piece of dough, is disengaged from the holding belt. Such a configuration may have the advantage that the turning portion is rotated as far as possible, preferably by more than 90 degrees, more preferably by more than 180 degrees, relative to the first portion while the first portion is still in engagement with the holding belt. Thus, a more reliable rotation of the two portions relative to each other may be achieved.

Advantageously, a pivot axis about which the hook may be pivoted, is oriented transversely, preferably perpendicularly, to the production direction. In this way, the driving effect of the conveyor described above may be utilized particularly effectively. The pivot axis may be arranged upstream of a downstream end portion of the holding belt.

It is conceivable that a conveying speed of the conveyor and a conveying speed of the holding belt are different. This may support the rotation of the first portion and the turning portion relative to each other, in particular by rotating the first portion in a suitable direction. It is particularly advantageous if a conveying speed of the conveyor is lower than a conveying speed of the holding belt.

Downstream of the holding belt, in particular downstream of a downstream end portion of the holding belt, a pressing device may be arranged. In particular, the pressing device may be arranged above the conveyor. Additionally or alternatively, the pressing device may be configured to press twisted dough products generated by twisting pieces of dough as described above against the conveyor. This may have the advantage that the twisted dough products do not return to an untwisted state of the piece of dough, for example, due to elastic restoring forces. The pressing device may be, for example, a conveyor belt or one or more carrier straps, which may be arranged above the conveyor.

The application also relates to a method for twisting pieces of dough. The method comprises conveying pieces of dough in a production direction by a conveyor, engaging a first portion of one of the pieces of dough arranged on the conveyor by at least one holding belt arranged above the conveyor, and turning a turning portion of the piece of dough relative to the first portion and upwardly while the holding belt engages the first portion of the piece of dough by a turning device. An upward movement may be considered to be a movement directed away from the conveyor.

By rotating the turning portion upward while the holding belt is engaged with the first portion, the turning portion and the first portion may be twisted relative to each other. The method allows for a much simpler construction of the executing device than prior art embodiments with rotating grippers, which additionally must transport the twisted dough product from one conveyor belt to another. In addition, the simultaneous engagement of the holding belt with the first portion of the piece of dough and the twisting device with the twisting portion enables the portions to be twisted with respect to one another, whereas prior art embodiments having hooks only allow for winding.

It is conceivable that the first portion and the turning portion are twisted by 180° relative to each other. For such single twists, the method may be particularly advantageous, since in these applications, in addition to the simpler construction of the performing device compared to the prior art, it may also ensure comparably fast twisting.

The first portion and the turning portion may be arranged side by side in a transverse direction oriented transversely, preferably perpendicularly, to the production direction. This may enable the piece of dough to be twisted about an axis that extends transverse, preferably perpendicular, to the production direction. This may be advantageous as the movement of the conveyor may be used to assist in rotating the turning portion.

It may be advantageous if the conveyor and the holding belt are driven at different conveying speeds. This may assist the rotation of the first portion and the turning portion relative to each other, in particular by rotating the first portion in a suitable direction. It is particularly advantageous if the conveyor is driven at a conveying speed that is lower than a conveying speed of the holding belt.

BRIEF DESCRIPTION OF THE DRAWINGS

The disclosure relates to a device as well as to a method of the type described above. In the following, an advantageous embodiment is explained by way of example with reference to drawings.

DETAILED DESCRIPTION

Figure 1:
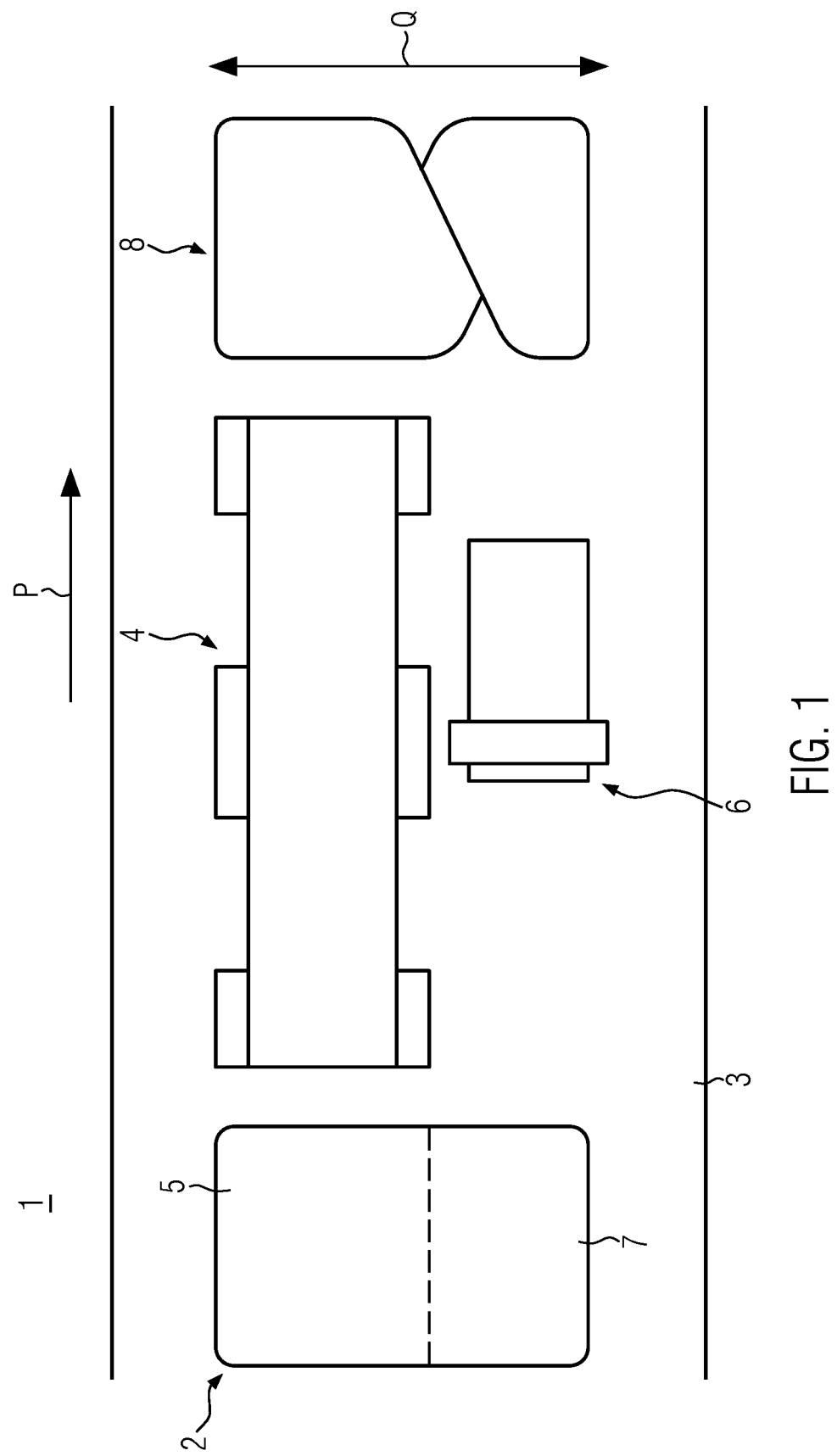
FIG. 1 shows a schematic top view of a device for twisting pieces of dough.

In FIG. 1, a device 1 for twisting pieces of dough 2 is shown in a schematic top view. The device 1 may comprise a conveyor 3. The conveyor 3 may be configured to convey pieces of dough in a production direction P. As in the present embodiment, the conveyor 3 may comprise a conveyor belt. The device 1 may further comprise a holding belt 4. The holding belt 4 may be arranged above the conveyor 3. As in the present embodiment, the holding belt 4 may be configured to engage with a first portion 5 of a piece of dough 2 arranged on the conveyor 3. The device 1 may further comprise a turning device 6. The turning device 6 may be configured to turn a turning portion 7 of the piece of dough 2 relative to the first portion 5 and upwardly while the holding belt 4 engages with the first portion 5 of the piece of dough 2.

The first portion 5 of the piece of dough 2 and the turning portion 7 of the piece of dough 2 may be arranged side by side in a transverse direction Q. The transverse direction Q may be oriented transversely, preferably perpendicularly, to the production direction P. The holding belt 4 and the turning device 6 may be arranged side by side in the transverse direction Q. By twisting the turning portion 7 of the piece of dough 2 relative to the first portion 5 of the piece of dough 2, a twisted dough product 8 may be produced.

Figure 2:
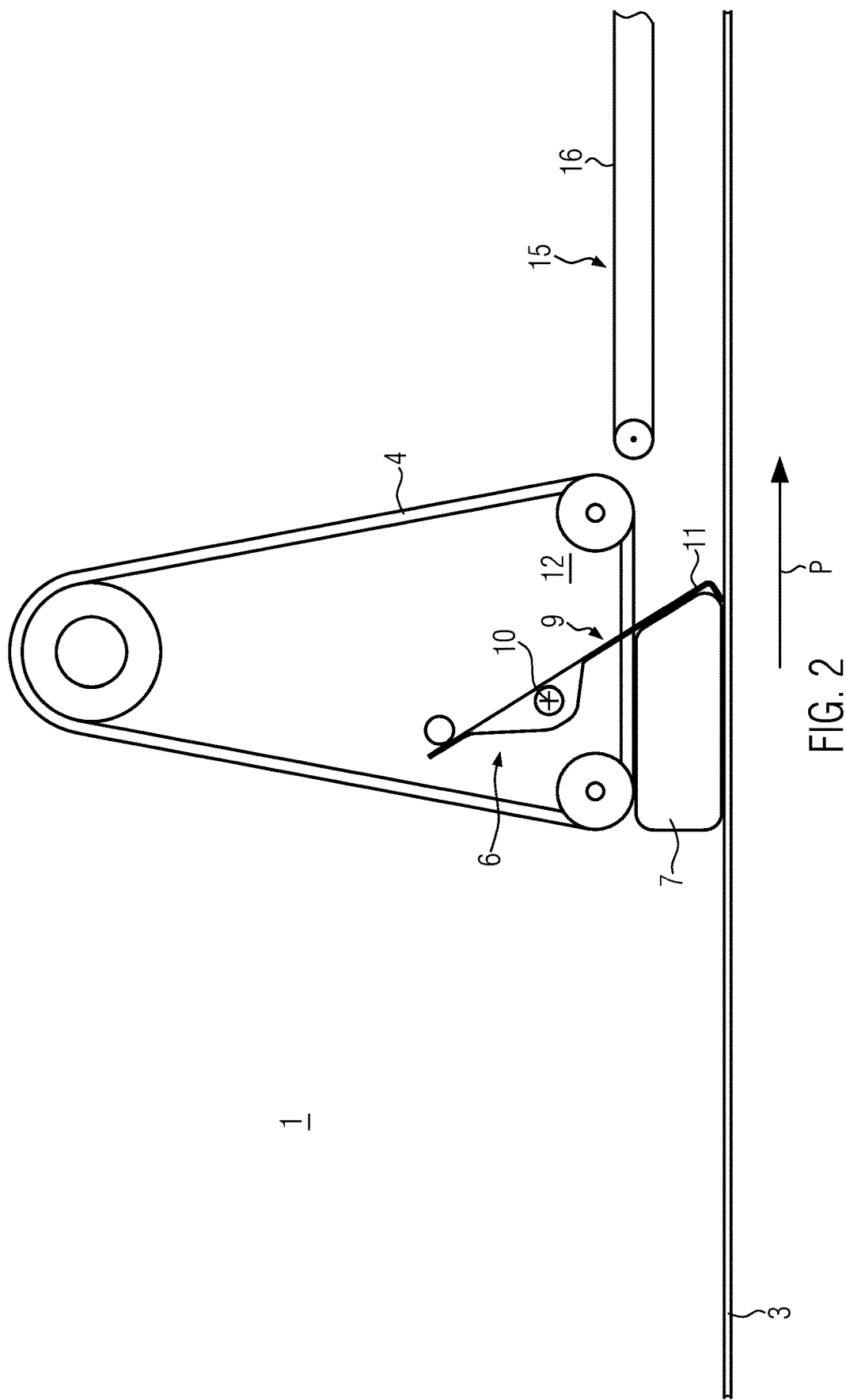
FIGS. 2 to 5 show schematic side views of the device from FIG. 1, with a hook shown in different pivot positions.

FIG. 2 shows a schematic side view of the device 1. Thus, it can be seen that the turning device 6 may comprise at least one hook 9. The hook 9 may be arranged pivotably, in particular about a pivot axis 10, above the conveyor 3. The pivot axis 10 may be oriented transversely, preferably perpendicularly, to the production direction P. The hook 9 may have an engagement portion 11. The engagement portion 11 may be configured to engage with a piece of dough 2 conveyed on the conveyor 3. In particular, the engagement portion 11 may be configured to engage with the turning portion 7 of the piece of dough 2 conveyed on the conveyor 3.

For better clarity, in FIG. 2 (as well as in the following FIGS. 3 to 5) only the turning portion 7 of the piece of dough 2 is shown. Due to the engagement of the engagement portion 11 with the piece of dough 2, in particular the turning portion 7 of the piece of dough 2, and the conveying of the piece of dough 2 by the conveyor 3, the hook 9 may be pivoted from a starting position 12 (shown in FIG. 2) to a deflected position 13 (shown in FIG. 4).

Figure 3:
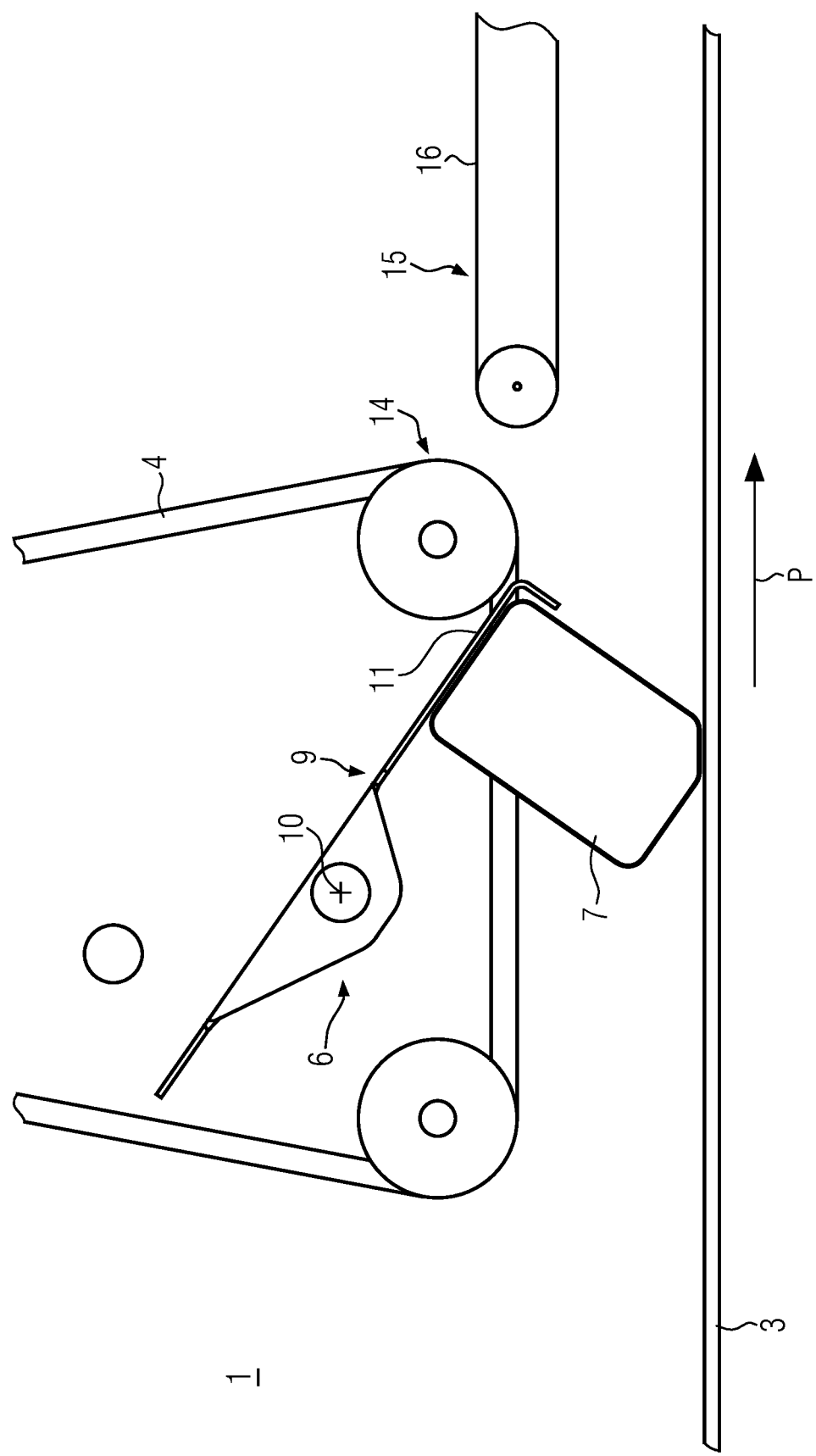

In FIG. 3, the device 1 is also shown in a schematic side view, similar to the view in FIG. 2. However, the hook 9 is shown in a pivoted position between the starting position 12 and the deflected position 13. It can be seen that the turning portion 7 may be turned upwards by the movement of the conveyor 3, the engagement of the engagement portion 11 with the turning portion 7 and the pivoting movement of the hook 9. As a result of the fact that the first portion 5 of the piece of dough 2 (not shown in FIG. 3) may be held by the holding belt 4 at the same time, the first portion 5 and the turning portion 7 may be twisted relative to each other. The holding belt 4 may have a downstream end portion 14. At the downstream end portion 14, the piece of dough 2, in particular the first portion 5 of the piece of dough 2, may be disengaged from the holding belt 4. The pivot axis 10 may be arranged upstream of the downstream end portion 14 of the holding belt 4.

Figure 4:
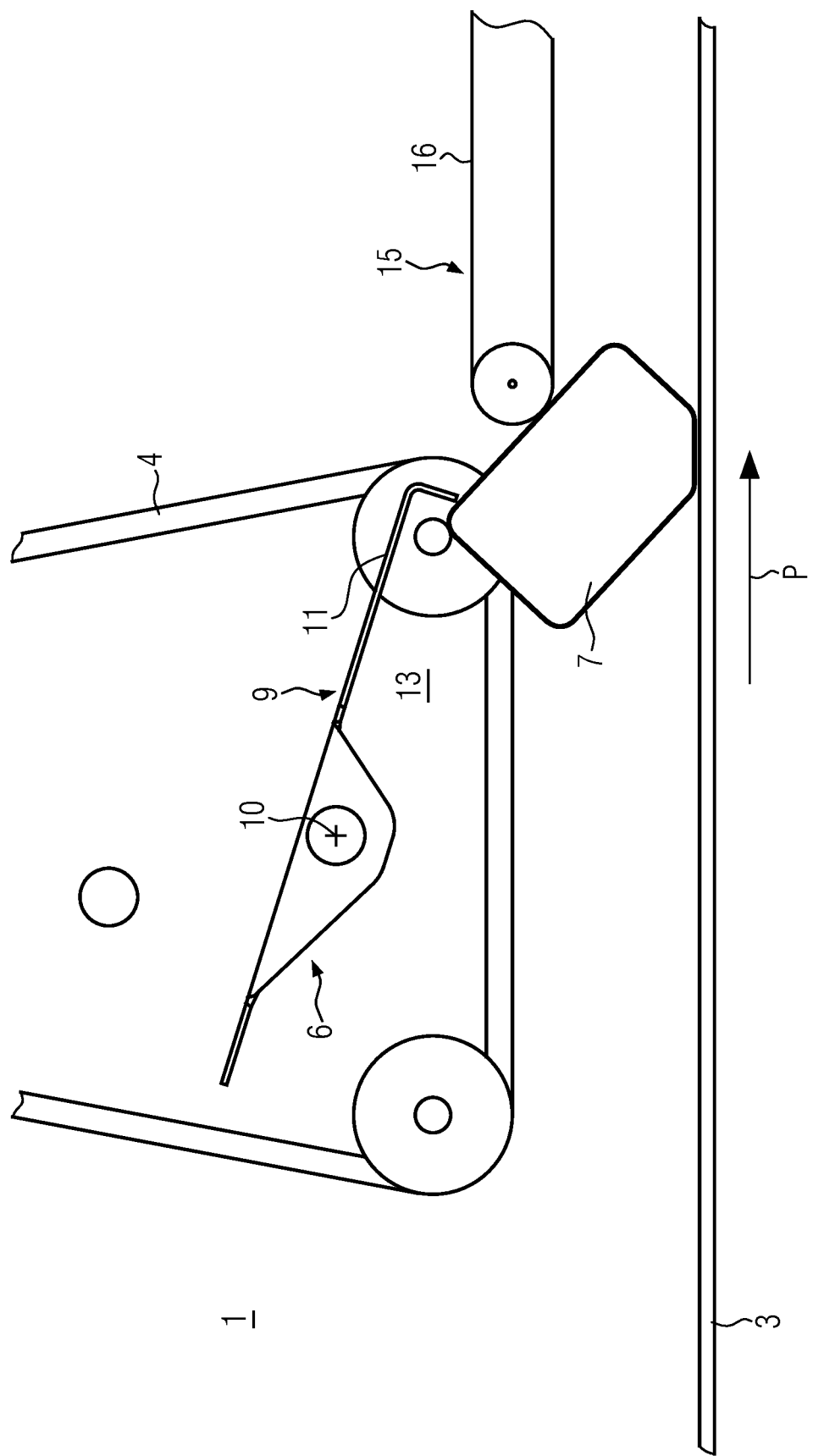

In FIG. 4, the device 1 is shown in a schematic side view similar to the views from FIGS. 2 and 3. In FIG. 4, the hook 9 is shown in the deflected position 13. The turning portion 7 is shown in an orientation rotated by approximately 180° with respect to that shown in FIG. 2. This rotation, as well as the continued conveyance of the piece of dough 2 by the conveyor 3, may enable the engagement portion 11 of the hook 9 and the turning portion 7 of the piece of dough 2 to be disengaged from one another. It can be seen that, in the deflected position 13, the engagement portion 11 of the hook 9 may be located upstream of the downstream end portion 14 of the holding belt 4.

Figure 5:
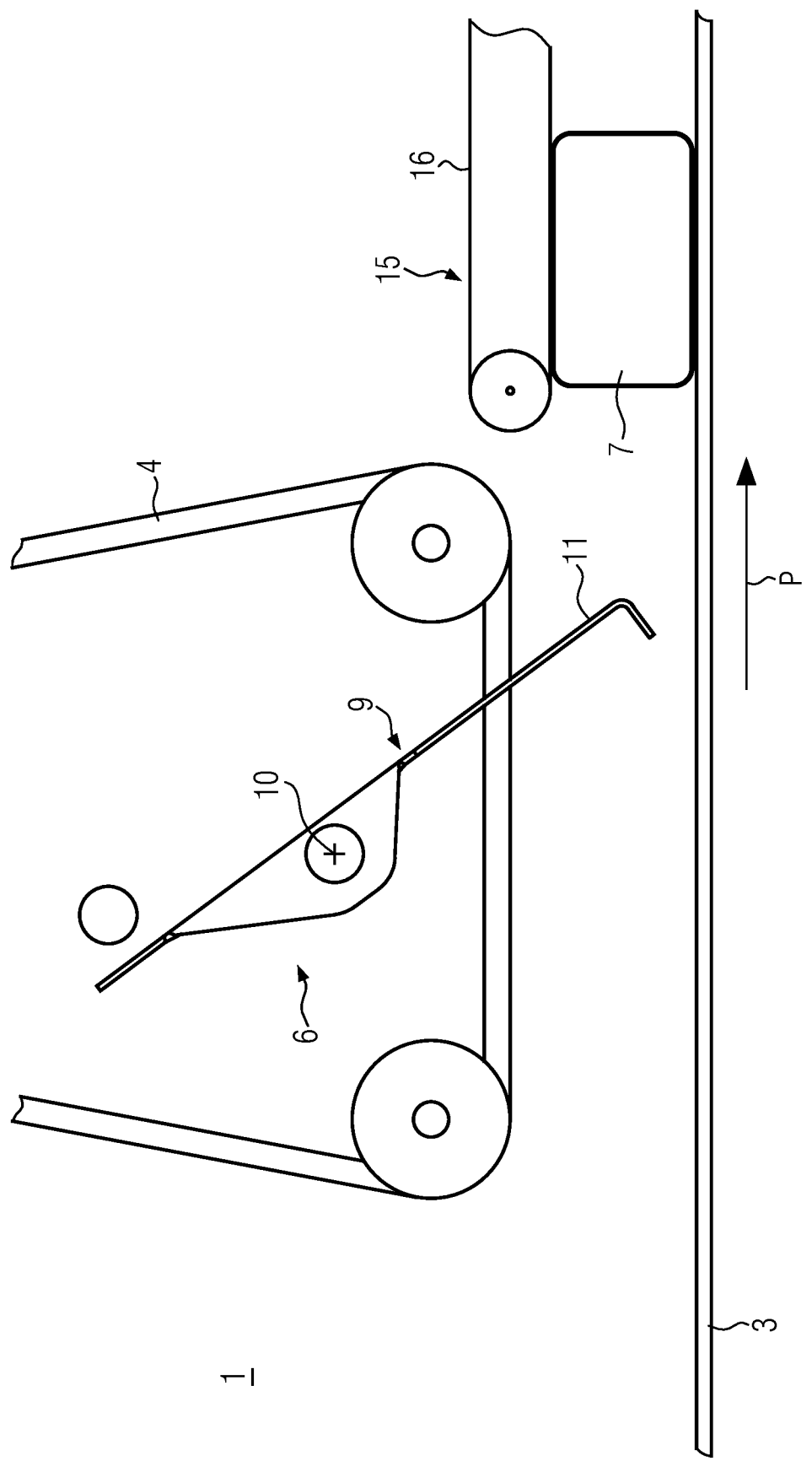

The device 1 may further comprise a pressing device 15. The pressing device 15 may be configured to press the piece of dough 2 and/or the twisted dough product 8 against the conveyor 3. An incipient engagement between the piece of dough 2 and the pressing device 15 can already be seen in FIG. 4. In FIG. 5, it can be seen that the turning portion 7 of the piece of dough 2 has been rotated 180° with respect to the orientation of the turning portion 7 of the piece of dough 2 shown in FIG. 2. The pressing device 15 may comprise a conveyor belt 16. In FIG. 1, the pressing device 15 is not shown for the sake of clarity.

In the preferred embodiment of the device 1, the holding belt 4 and the conveyor 3 may be driven at different conveying speeds. Particularly preferred is an embodiment in which the conveying speed of the conveyor 3 is lower than the conveying speed of the holding belt 4. As a result, a rotational momentum that is opposite to the direction of rotation of the turning portion 7 of the piece of dough 2 may be impressed on the first portion 5 of the piece of dough 2. This may facilitate the rotation of the turning portion 7 and the first portion 5 relative to each other and/or prevent the first portion 5 from being turned along with the turning portion 7.

What is claimed is:

1. A device for twisting pieces of dough, comprising:
   a conveyor configured to convey pieces of dough in a production direction;
   at least one holding belt arranged above the conveyor and configured to engage with a first portion of a piece of dough arranged on the conveyor; and
   a turning device configured to turn a turning portion of the piece of dough relative to the first portion and upwardly while the at least one holding belt engages with the first portion of the piece of dough;
   wherein the at least one holding belt and the turning device are arranged side by side in a transverse direction oriented transversely to production direction, and wherein the turning device comprises a hook pivotally arranged above the conveyor and configured to engage the turning portion of the piece of dough while the at least one holding belt engages with the first portion of the piece of dough.

2. The device according to claim 1, wherein the transverse direction is oriented perpendicularly to the production direction.

3. The device according to claim 1, wherein the hook comprises an engagement portion configured to engage the turning portion of the piece of dough.

4. The device according to claim 3, wherein the hook is pivotable from a starting position towards a deflected position by engagement of the engagement portion with the turning portion of the piece of dough and conveyance by the conveyor of the piece of dough.

5. The device according to claim 4, wherein the engagement portion of the hook is arranged upstream of a downstream end portion of a holding belt of the at least one holding belt when the hook is in the deflected position.

6. The device according to claim 1, wherein a pivot axis about which the hook is pivotable is oriented transversely to the production direction.

7. The device according to claim 6, wherein the pivot axis is oriented perpendicularly to the production direction.

8. The device according to claim 6, wherein the pivot axis is arranged upstream of a downstream end portion of a holding belt of the at least one holding belt.

9. The device according to claim 1, wherein a conveying speed of the conveyor and a conveying speed of the at least one holding belt are different.

10. The device according to claim 1, wherein a conveying speed of the conveyor is lower than a conveying speed of the at least one holding belt.

11. The device according to claim 4, wherein the engagement portion of the hook is arranged above a lower surface of a holding belt of the at least one holding belt when the hook is in the deflected position.

12. The device according to claim 6, wherein the pivot axis is disposed between an upstream end portion and a downstream end portion of a holding belt of the at least one holding belt.

13. A method for twisting pieces of dough, comprising:
    conveying pieces of dough in a production direction by a conveyor;
    engaging a first portion of one of the pieces of dough arranged on the conveyor by a holding belt arranged above the conveyor; and
    turning, by a turning device, a turning portion of the one piece of dough relative to the first portion and upwardly while the holding belt engages with the first portion of the one piece of dough;
    wherein the holding belt and the turning device are a side by side in a transverse direction oriented transversely to the production direction, and wherein the turning device comprises a hook pivotally arranged above the conveyor and configured to engage the turning portion of the one piece of dough while the holding belt engages with the first portion of the one piece of dough.

14. The method according to claim 13, wherein the first portion and the turning portion are twisted 180° relative to each other.

15. The method according to claim 13, wherein the first portion and the turning portion are arranged side by side in the transverse direction.

16. The method according to claim 15, wherein the transverse direction is oriented perpendicularly to the production direction.

17. The method according to claim 13, wherein the conveyor and the holding belt are driven at different conveyor speeds.

18. The method according to claim 13, wherein the conveyor is driven at a conveying speed that is lower than a conveying speed of the holding belt.

19. The method according to claim 13, wherein the hook comprises an engagement portion configured to engage the turning portion of the one piece of dough, the hook is pivotable from a starting position towards a deflected position by engagement of the engagement portion with the turning portion of the one piece of dough and conveyance by the conveyor of the one piece of dough, and the engagement portion of the hook is arranged above a lower surface of the holding belt when the hook is in the deflected position.

20. The method according to claim 13, wherein a pivot axis about which the hook is pivotable is oriented transversely to the production direction, and the pivot axis is disposed between an upstream end portion and a downstream end portion of the holding belt.

\* \* \* \* \*